S. G. MEEKER.
LOCK NUT.
APPLICATION FILED DEC. 14, 1907. RENEWED DEC. 26, 1908.

961,249.

Patented June 14, 1910.

Witnesses:
H. A. Lamb
G. W. Finn

Inventor
Samuel G. Meeker
By his Attorney Geo. D. Phillips

UNITED STATES PATENT OFFICE.

SAMUEL G. MEEKER, OF NEW YORK, N. Y., ASSIGNOR TO MEEKER GRIP NUT COMPANY, A CORPORATION OF NEW YORK.

LOCK-NUT.

961,249. Specification of Letters Patent. Patented June 14, 1910.

Application filed December 14, 1907, Serial No. 406,453. Renewed December 26, 1908. Serial No. 469,375.

*To all whom it may concern:*

Be it known that I, SAMUEL G. MEEKER, a citizen of the United States, and a resident of New York, in the county of New York and State of New York, have invented certain new and useful Improvements in Lock-Nuts, of which the following is a specification.

My invention relates to an improvement in lock nuts, and it consists in certain features of which an example is shown in the accompanying drawings, in which:—

Figure 1:
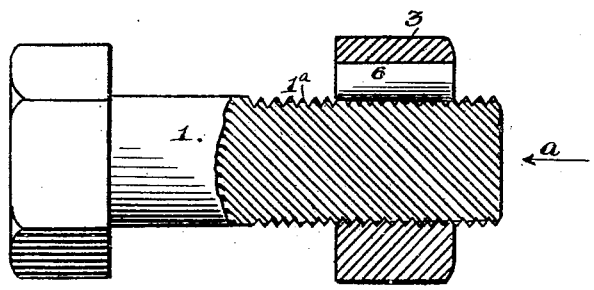
Figure 2:
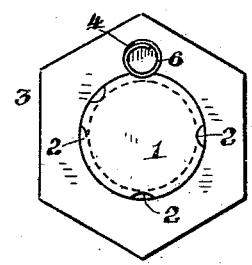
Figure 3:
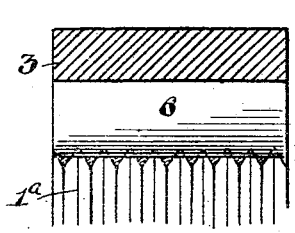
Figure 4:
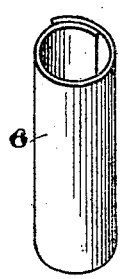
Figure 5:
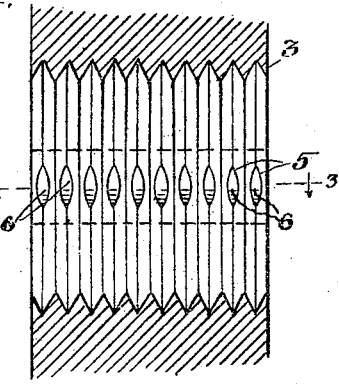
Figure 6:
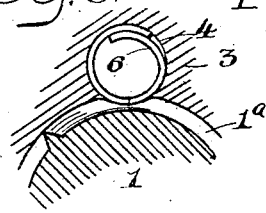
Figure 7:
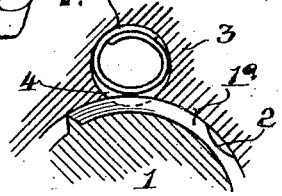

Figure 1 represents a sectional view of the nut, and the bolt partly in section, together with a longitudinal view of the locking means comprising a circular spring made of sheet metal; Fig. 2 is a view of the bolt and nut looking in the direction of arrow $a$ of Fig. 1; Fig. 3 is a sectional view of a portion of the nut on line 3 of Fig. 5, showing the locking spring in place; Fig. 4 is a detail view in perspective of the locking spring; Fig. 5 is a broken sectional view of the interior of the nut; Fig. 6 is an end view of the locking spring and broken section of the bolt and nut; Fig. 7 is a view similar to Fig. 6, showing the spring compressed.

1 represents a bolt shown as having one or more longitudinal grooves 2 located around the circumferential surface of threaded portions.

3 is the nut and 4 is a hole formed close to the bore of the nut and parallel with its axis. This hole is formed so as to intersect the threads of the nut, leaving openings 5 in the bottom of the threads, through which openings the locking spring 6 is visible as shown at Fig. 5.

The locking spring 6 is made of sheet steel and is shown as circular in form and as having overlapping edges. This spring is inserted in the hole 4 of the nut and may be insured against falling out by simply upsetting the edges of the hole in the nut. When the spring is in place, the nut is mounted on the bolt with the threads $l^{\mathrm{a}}$ of the bolt in frictional contact with the spring through the openings 5. This frictional engagement will slightly compress the spring as shown at Fig. 7 and thus prevent the nut jarring loose when the spring is not in one of the grooves 2 of the bolt. When the spring is over one of the grooves it will spring out and fill the same, and it will require considerable force to compress the spring in order to dislodge it from the groove.

It will doubtless be understood from the foregoing description that an operative feature of my improvement is a nut having a detent which will secure it in firm engagement with a bolt, but withal permit of its rotation in either direction upon the application of sufficient force.

One structural feature of the improvement is a nut having combined with it a detent protruding from a spring toward the axis of the nut, and having its protruding portion formed similarly on each side of a median line, so as to permit of rotating the nut about a bolt in either direction upon the application of sufficient force circumferentially of the nut.

Another structural feature of the improvement is such a combination between a nut and a detent protruding from a spring, that the detent may move radially to the axis of the nut, and as a consequence will conduce to the possibility of a rotary movement of the nut in either direction about a bolt upon the application of sufficient force circumferentially of the nut.

Another structural feature of the improvement is the combination with a nut of a spring which is round or approximately round relatively to an axis parallel to the axis of the nut; said spring being fitted into a recess formed in the nut, so that a segmental portion of its rounded surface will protrude beyond the inner surface of the nut, and constitute a detent having on opposite sides of a median line similar portions adapted to permit rotation of the nut about a bolt upon the application of sufficient force circumferentially of the nut.

All these features involve a detent saliently or convexly surfaced at an operative portion which protrudes beyond the inner surface of a nut.

Having thus described my invention, what I claim as new and desire to secure by Letters Patent is:

1. A nut having entirely inside of its outer circumference, a recess which is parallel with its axis, and a detent protruding from a spring supported in said recess, and saliently or convexly formed in both directions on opposite sides of a line radial to the nut, said protuberant portion being adapted to contact with a threaded bolt constructed to engage with the threaded portion of the nut.

2. The combination with a nut, of a spring which is round or approximately round relatively to an axis parallel to the axis of the nut, said spring being fitted into a recess formed in the nut, so that a segmental portion of its rounded surface will protrude beyond the inner surface of the nut and constitute a detent having on opposite sides of a median line similar portions adapted to permit rotation of the nut about a bolt upon the application of sufficient force circumferentially of the nut.

3. A threaded nut having an opening parallel with but wholly at one side of its axis, and a spring supported in said opening and having a protuberant portion rounded in both directions from the center of said protuberant portion, said spring being so constructed and fitted to said opening that the said protuberant portion of the spring may move radially to the axis of the nut.

4. A nut having an opening formed entirely inside the nut, parallel with but wholly at one side of the axis of the nut, and a compressible spring supported in said opening and having a protuberant portion which, in a plane transverse to the axis of the nut, is saliently or convexly bent toward the axis of the nut in both directions from the points of its protrusion, said protuberant portion of the spring being adapted to contact with a threaded bolt constructed to engage with the threaded portion of the nut.

5. A nut having a circular opening parallel with, but wholly at one side of its axis and a circular spring supported in said opening with its axis parallel with the axis of the nut and having a salient or convex portion protruding toward the axis of the nut, said protruding portion of the spring being adapted to contact with a threaded bolt constructed to engage with the threaded portion of the nut and to permit rotation of the nut in either direction about a bolt by the application of sufficient force circumferentially of the nut.

6. A nut having an opening parallel with, but wholly at one side of its axis and a compressible tube-like spring supported in said opening and having a portion which in a plane transverse to the axis of the nut, is saliently or convexly curved opposite the axis of the nut, said portion of the spring being adapted to contact with a threaded bolt constructed to engage with the threaded portion of the nut.

7. A nut having an opening parallel with, but wholly at one side of the central opening of the nut, the said openings intersecting each other, a compressible, tube-like spring, supported in the first mentioned opening adapted to bear against a bolt entering said central opening at the point of intersection of said openings.

8. A nut having an opening formed entirely inside the nut, parallel with the axis of the nut, and a sheet metal spring supported in said opening and having protruding therefrom a portion bent in a plane transversely to the axis of the nut and similarly convexly from both sides of the opening toward the axis of the nut, and adapted to contact with a threaded bolt.

9. A nut having an opening parallel with its axis, a sheet metal spring having overlapping ends, bent in a plane transversely to the axis of the nut and convexly toward the axis of the nut and located in said opening and adapted to contact with a threaded bolt.

10. A nut having an opening in its body formed entirely inside the nut parallel with the axis of the nut, and a compressible sheet metal spring of circular formation located in the said opening of the nut, and having an arc-shaped portion protruding from the opening and adapted to contact with a threaded bolt.

11. A nut having an opening in its body entirely inside the nut parallel with the axis of the nut, and a compressible sheet metal spring of circular formation located in said opening and having an arc-shaped portion adapted to contact with a threaded bolt.

Signed at Bridgeport in the county of Fairfield and State of Connecticut this 2d day of December A. D. 1907.

SAMUEL G. MEEKER.

Witnesses:
S. B. BREWSTER,
GEO. D. PHILLIPS.